United States Patent
Yang

(10) Patent No.: US 7,463,255 B2
(45) Date of Patent: Dec. 9, 2008

(54) PORTABLE ELECTRONIC APPARATUS AND POWER MANAGEMENT METHOD THEREOF

(75) Inventor: Yu-Chuan Yang, Taipei (TW)

(73) Assignee: Mediatek Incorporation, Hsin-Chu (TW)

(*) Notice: Subject to any disclaimer, the term of this patent is extended or adjusted under 35 U.S.C. 154(b) by 776 days.

(21) Appl. No.: 11/001,766

(22) Filed: Dec. 2, 2004

(65) Prior Publication Data

US 2005/0124389 A1    Jun. 9, 2005

(30) Foreign Application Priority Data

Dec. 5, 2003   (TW) .............................. 92134468 A
Nov. 16, 2004  (TW) .............................. 93135153 A

(51) Int. Cl.
   *G09G 5/00*    (2006.01)
(52) U.S. Cl. ........................ 345/211; 345/204
(58) Field of Classification Search .......... 345/90–104, 345/204–215
   See application file for complete search history.

(56) References Cited

U.S. PATENT DOCUMENTS

| | | | | |
|---|---|---|---|---|
| 5,875,348 | A * | 2/1999 | Matsushima et al. | 710/4 |
| 6,000,035 | A * | 12/1999 | Matsushima et al. | 713/320 |
| 7,013,183 | B1 * | 3/2006 | Solomon | 700/11 |
| 7,164,442 | B2 * | 1/2007 | Takane | 348/240.2 |

* cited by examiner

*Primary Examiner*—Vijay Shankar
(74) *Attorney, Agent, or Firm*—Thomas, Kayden, Horstemeyer & Risley

(57) ABSTRACT

A power management method applied in a portable electronic device is provided. When the portable electronic device enters a standby state, the method starts a frame refresh timer, wherein a timing period of the frame refresh timer is a frame refresh timing period; and starts a suspension timer, wherein a timing period of the suspension timer is a suspension timing period. When the portable electronic device is in the standby state, and when a frame refresh timing period of the frame refresh timer is completed, the portable electronic device displays one of the frames and sets the frame refresh timer to begin another frame refresh timing period for consecutively displaying the frames. When a suspension timing period of the suspension timer is completed, the portable electronic device suspends the frame refresh timer and enters a power saving state.

29 Claims, 4 Drawing Sheets

PORTABLE ELECTRONIC APPARATUS AND POWER MANAGEMENT METHOD THEREOF

This application claims the benefit of Taiwan applications, Serial No. 92134468, filed Dec. 5, 2003, and Taiwan application Serial No. 93135153, filed Nov. 16, 2004, the subject matters of which are incorporated herein by reference.

BACKGROUND OF THE INVENTION

1. Field of the Invention

The invention relates in general to an electronic apparatus and a power management method thereof, and more particularly to a portable electronic apparatus and a power management method thereof.

2. Description of the Related Art

Along with the success in scaling down the sizes of chips and parts, most portable electronic devices such as mobile phone, personal digital assistant, digital camera, and MP3 player (MPEG-3 player) are equipped with diversified functions to satisfy users' increasing needs. Apart from hardware design, a portable electronic device is further equipped with programmable functions to execute various application programs and provide diversified functions according to users' needs.

What is emphasized in a portable electronic device, a mobile phone for instance, is power saving or low power-consumption so as to prolong the standby time. Along with users' increasing needs, a portable electronic device must have convenient and attractive functions to attract the users particularly in the design of man-machine-interface (MMI). However, increasingly various functions will increase the complexity of man-machine-interface, and the processor of the portable electronic device will consume more power due to increased workload.

Therefore, most portable electronic devices are equipped with power management function to save power. Take a mobile phone for example. The power management function of the mobile phone will turn off the backlight source of the screen to save power when the mobile phone is in a standby state. Currently, most portable electronic devices, a mobile phone for instance, is equipped with a color liquid crystal display, which is more power consuming than a mono-color liquid crystal display. Moreover, in order to arouse the user's interest, the mobile phone is even equipped with animation playing function, which further increases power consumption. The conventional power management method will turn off the backlight source of the screen during the standby period. The conventional mobile phone power management method can only save power by controlling the switching off of the hardware, and is unable to reduce power consumption regarding animation playing. Moreover, the animation will be played again when the user of the mobile phone touches the input interface for viewing the displaying of the display screen. Furthermore, when the portable electronic device turns on the backlight and returns to the standby state, the displaying delay of the following frame sometimes even makes the user feel that the mobile phone is hung. Such frame displaying delay brings inconvenience to the user and makes the user feel the mobile phone is unavailable. A negative evaluation of the mobile phone will thus be generated.

Considering the current trend for function diversification of portable electronic devices, new products will be continuously developed to enhance the visual effect of the man-machine-interface, particularly the animation playing function. Such enhancement of visual effect, which increases the power consumption of portable electronic device, will relatively reduce the duration of standby time. Moreover, the frame displaying delay, which occurs when the portable electronic device turns on the backlight and returns to the standby state, makes the user feel inconvenient and even bear a negative evaluation of the portable electronic device. Consequently, negative impact is imposed on the competitive capacity of the product.

Therefore, the designer of portable electronic device must provide a solution to resolve the above problems.

SUMMARY OF THE INVENTION

It is therefore an object of the invention to provide a portable electronic apparatus and a power management method thereof to reduce the power consumption of displaying an image sequence, such as animation or pictures. In addition, the delay of displaying the image sequence, which occurs when the portable electronic device returns to a standby state from a power saving state, can be improved.

According to the object of the invention, a power management method of a portable electronic device is provided, and the method includes the following steps. First, a frame refresh timer is started, and its timing period is a frame refresh timing period. Then, a suspension timer is started, and its timing period suspension timer is a suspension timing period. When a frame refresh period is completed, the portable electronic device performs an image processing operation, displays the result of the image processing operation, and resets the frame refresh timer to begin another frame refresh timing period. When a suspension timing period is completed, the frame refresh timer is suspended. When the frame refresh timer is suspended, the portable electronic device does not process the image processing operation in order to reduce power consumption of the portable electronic device.

According to the object of the invention, a portable electronic apparatus is provided. The portable electronic apparatus includes a memory device and a processor. The memory device stores a plurality of instructions. The processor, coupled to the memory device, is used for executing the instructions for performing acts including: starting a frame refresh timer, wherein a timing period of the frame refresh timer is a frame refresh timing period; starting a suspension timer, wherein a timing period of the suspension timer is a suspension timing period; when the a frame refresh timing period is completed, performing an image processing operation so as to display the result of the image processing operation, and resetting the frame refresh timer to begin another frame refresh timing period; when a suspension timing period is completed, suspending the frame refresh timer; wherein when the frame refresh timer is suspended, the processor does not process the image processing operation in order to reduce power consumption of the portable electronic device.

Other objects, features, and advantages of the invention will become apparent from the following detailed description of the preferred but non-limiting embodiments. The following description is made with reference to the accompanying drawings.

DETAILED DESCRIPTION OF THE INVENTION

In the power management method according to the invention, the processing of programs being executed by the portable electronic device is considered for power saving, and the delay period after the processing of the programs is resumed is reduced.

Figure 1:
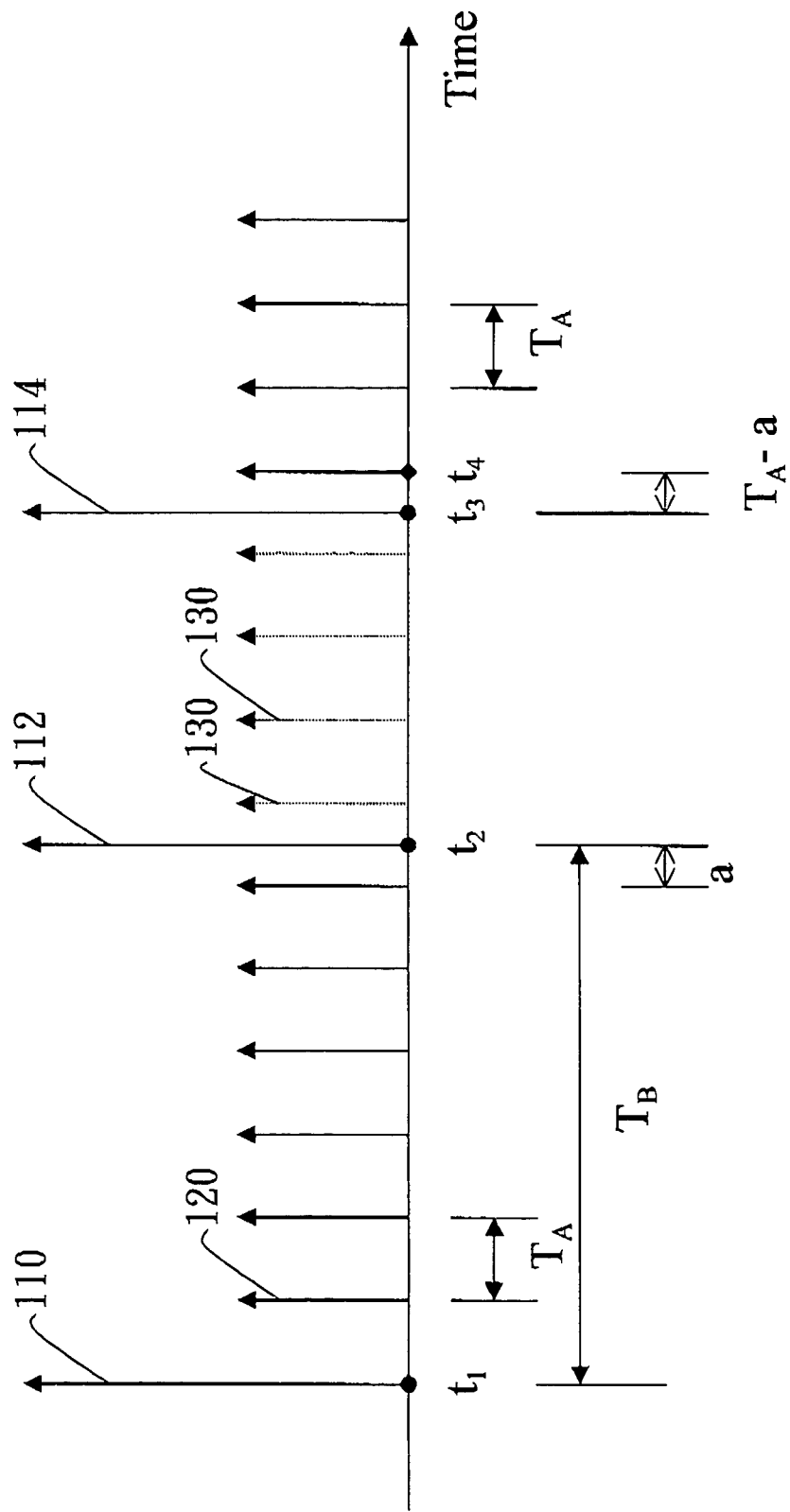
FIG. 1 is a time diagram for illustrating the power management method of portable electronic devices according to the invention.

Please refer to FIG. 1, which is a time diagram for illustrating the power management method of portable electronic devices according to the invention. The horizontal axis is a time axis, wherein each of the solid arrows located on the time axis represents an event, which occurs at a particular time, such as events 110, 112, 114 and 120. In contrast, each of the dotted arrows indicates an event that can be prevented from occurrence at a particular time according to the power management method of the invention, such as event 130. In the present example, the portable electronic device is pre-set to display an animation comprising a plurality of frames when being at a standby state for instance.

In FIG. 1, the portable electronic device enters a standby state at time $t_1$. Meanwhile, a frame refresh timer and a suspension timer are started, where the timing period of the frame refresh timer is a frame refresh timing period $T_A$ and the timing period of the suspension timer is a suspend period $T_B$. Afterwards, the portable electronic device enters a waiting state for waiting the occurrence of an event. That is, the portable electronic device is waiting for and ready to respond to various events.

When the portable electronic device is in a waiting state, the portable electronic device will function and operate in different ways according to various situations. When the frame refresh timing period $T_A$ is completed, as shown in event 120, the portable electronic device displays one of the frames, and then reset the frame refresh timer to consecutively and respectively display the following frames. By doing so, the portable electronic device can display the animation comprising the frames. When the suspension timing period $T_B$ is completed, suspension timer as indicated by an event 112, the frame refresh timer is suspended at time $t_2$, allowing the portable electronic device to enter a power saving state. In addition, if the portable electronic device is equipped with a liquid crystal display, the portable electronic device can turn off the backlight source to save power. Such power saving can be neglected for the portable electronic device equipped with a display, which is free of backlight source.

When the portable electronic device is in a power saving state, the portable electronic device will operate in different ways in response to different situations. When the portable electronic device receives a user-interface event, which does not require the displaying change on the screen (i.e., event 114 occurs, for example, when the input interface of the portable electronic device, a keyboard or a contact control screen for instance, is merely touched by the user), the portable electronic device, at time $t_3$, resume the frame refresh timer, re-starts the suspension timer, and enters the waiting state.

When the frame refresh timer is suspended, i.e., between time $t_2$ and $t_3$, the portable electronic device does not process the displaying of animation. In FIG. 1, the dotted arrows located between time $t_2$ to $t_3$ (i.e., event 130) represent events, which are supposed to occur due to the completion of the frame refresh period, but are actually prevented from occurrence because the frame refresh timer is suspended. Since the frame refresh timer is suspended, the portable electronic device does not process the display of the subsequent frames, which is capable of reducing power consumption.

As disclosed above, the frame refresh timer is resumed when the portable electronic device receives the user-interface event without requiring the displaying change on the screen. Resuming the frame refresh timer, specifically, means that the frame refresh timer resumes when a resuming timing period is completed. The resuming timing period (denoted by "$T_A$-a" in FIG. 1) is, for example, the difference between the frame refresh timing period $T_A$ and a suspension period (denoted by "a" in FIG. 1). The resuming timing period is the period during which the frame refresh timer is suspended. The suspension period is shorter than the frame refresh timing period $T_A$. In addition, after the resuming timing period ($T_A$-a) is completed, the next frame is displayed and the frame refresh timer is reset to begin another frame refresh timing period $T_A$ and continues timing by the completion of the frame refresh timing period $T_A$. Therefore, when the animation is resumed and played again because of the resumption of the frame refresh timer, the delay period for displaying the following frame immediately after the resumption of the frame refresh timer is reduced to be ($T_A$-a). Therefore, a next frame is displayed at time 4, without a long delay period after the resumption. By doing so, the delay period for animation displaying after the processing of animation is resumed is thus reduced.

Figure 2:
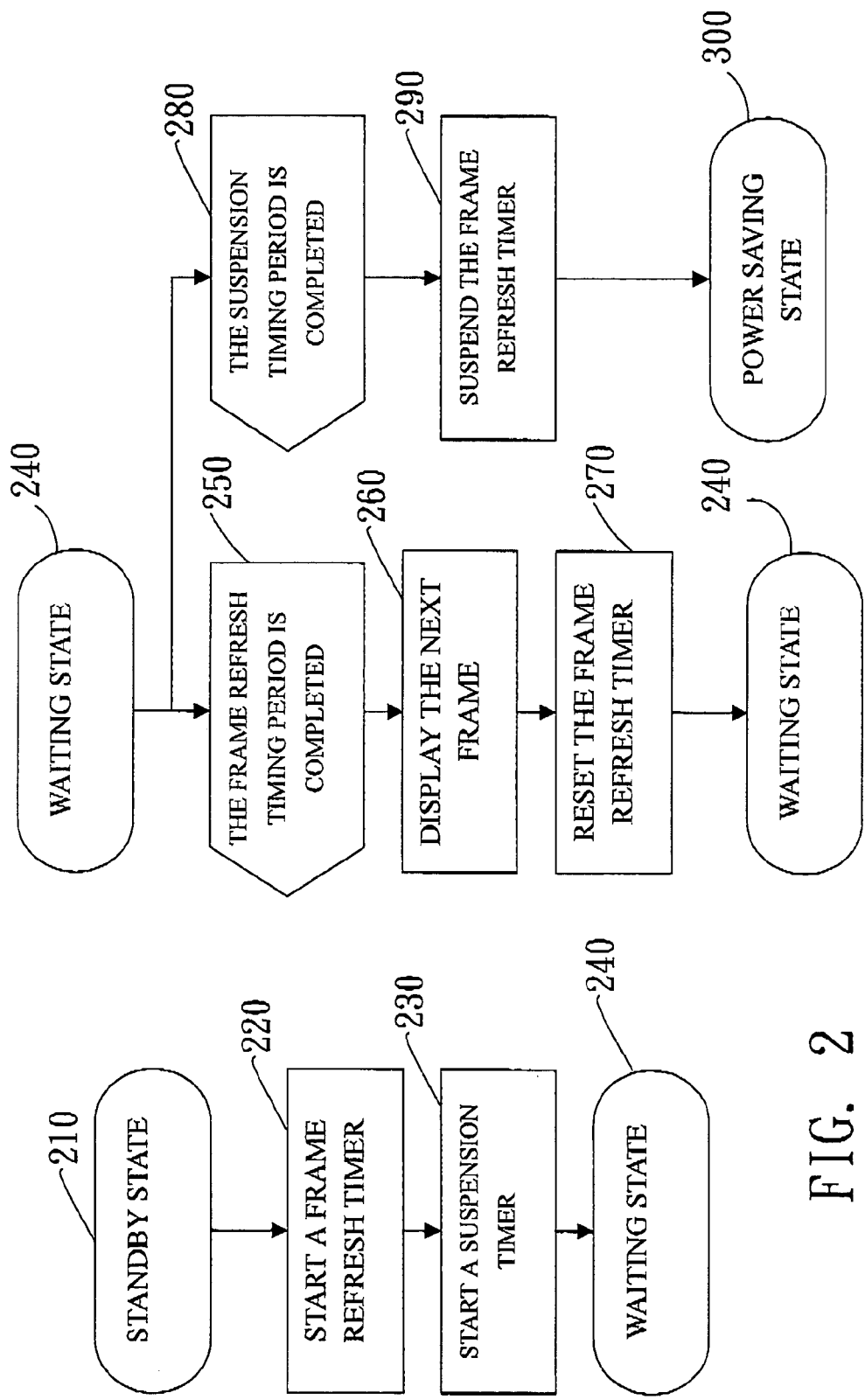
FIG. 2 and FIG. 3 are flowcharts illustrating the power management method of portable electronic devices according to a preferred embodiment of the invention.
Figure 3:
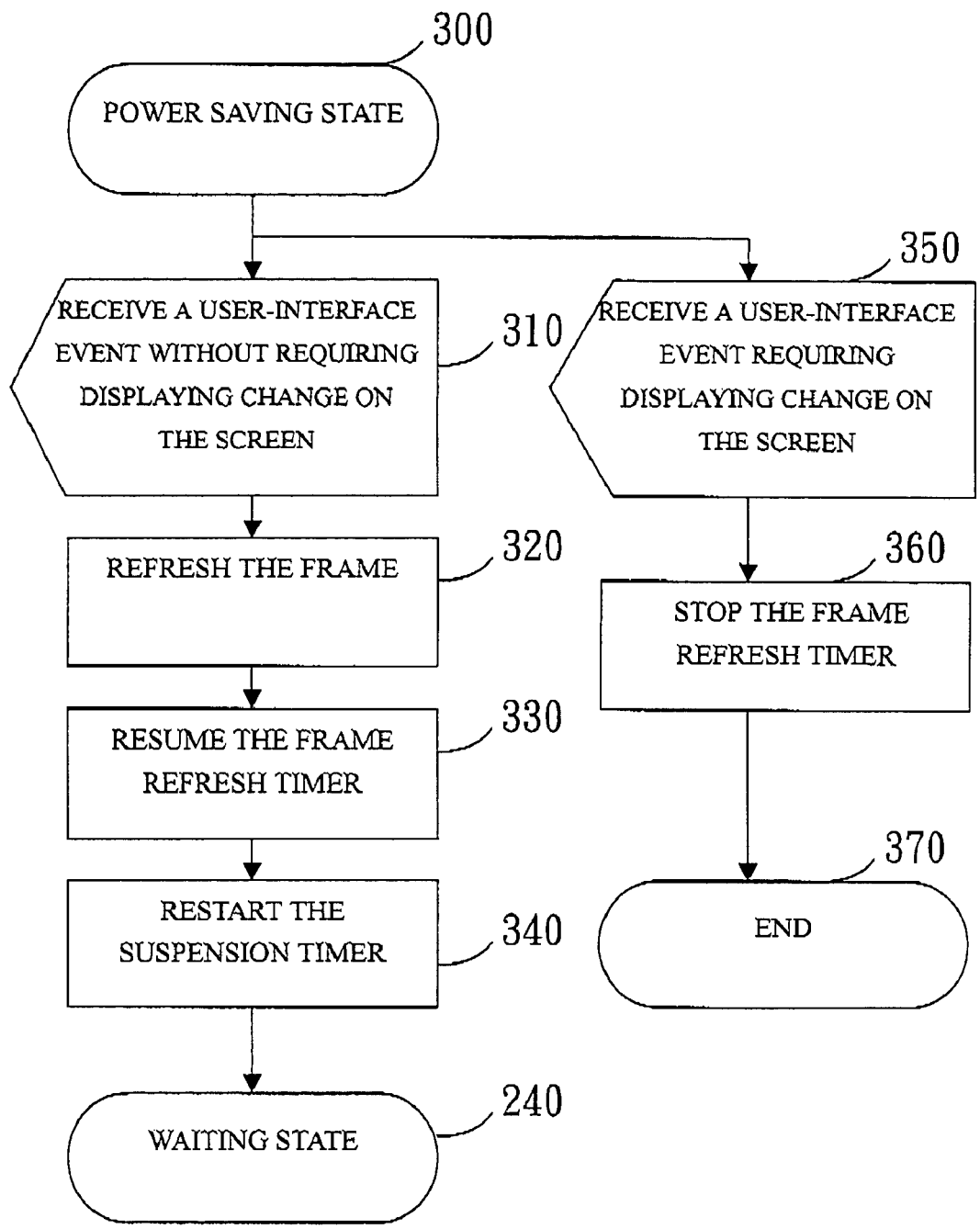

FIGS. 2 and 3 are flowcharts illustrating the power management method of a portable electronic device according to a preferred embodiment of the invention, wherein the portable electronic device is a mobile phone. In the present embodiment, the mobile phone displays an animation including a plurality of frames when being at a specific state, such as a standby state. The mobile phone includes a display screen and a backlight source thereof, a processor to execute the operating system, and a user input interface. The mobile phone is provided with a program library so that the software applications of the mobile phone can call various function routines to generate desired functions, for example, a timer or to control various hardware elements, a backlight source for instance. In the present embodiment, the power management of the mobile phone is achieved by a power management software application.

As shown in step 210 of FIG. 2, the mobile phone enters a standby state. In step 220, a power management module starts a frame refresh timer, wherein the timing period of the frame refresh timer is a frame refresh timing period $T_A$. In step 230, the power management module starts a suspension timer, wherein the timing period of the suspension timer is a suspension timing period $T_B$. The frame refresh timing period $T_A$ is shorter than the suspension timing period $T_B$. For example, $T_A$=1.0 second, and $T_B$=15 to 30 seconds. After that, as shown in step 240, the power management module enters a waiting state 240. That is, the portable electronic device is waiting for and ready to respond to and handle any event.

When the power management module is in the waiting state 240, the power management module will operate in different ways in response to different events. When the frame refresh timing period $T_A$ is completed, as in step 250, the power management module enables the portable electronic device to display one of the frames in step 260. In step 270, the power management module resets the frame refresh timer to begin another frame refresh timing period $T_A$. In this way, the portable electronic device can consecutively display the frames to achieve the display of the animation. During the continuous displaying of the frames, the power management module remains in the waiting state 240.

When the suspension timing period $T_B$ is completed, suspension timer as in step 280, the power management module enters step 290 to suspend the frame refresh timer. In addition, steps 290 and 280 may be implemented at the same time. Following that, the mobile phone enters a power saving state 300 (or suspend state), in which the power management module will turn off the backlight source of the mobile phone to save power.

Referring to FIG. 3, when the mobile phone is in a power saving state 300, the power management module will operate in different ways in response to different events. That is, the mobile phone can still perform some functions, such as the function of receiving an incoming phone call or a text message, to maintain the operation of the mobile phone. In step 310, when the mobile phone receives a user-interface event without requiring the displaying change on the screen, which occurs, for example, when the input interface of the mobile phone, a keyboard or a contact control screen for instance, is merely touched by the user, the power management module refreshes the frame, as shown in step 320, and the backlight module which is previously switched off will be switched on. Next, in step 330, the frame refresh timer is resumed so as to continue the displaying of the animation. Afterwards, the power management module restarts the suspension timer in step 340. Then, the power management module returns to the waiting state 240. That is, the mobile phone ends the power saving state and returns to the standby state to wait for the occurrence of various events. On the other hand, in step 350, when the mobile phone receives a user-interface event requiring the displaying change on the screen, which occurs, for example, when the user of the mobile phone inputs a number or clicks on a function via the input interface, the displaying on the screen needs to be changed accordingly (for example, the displaying on the screen is changed to display a corresponding number or text). Therefore, the power management module stops the frame refresh timer in step 360 so as to stop the displaying of animation. At last, in step 370, the power management module is terminated and other module is initiated to process and handle the event requiring the displaying change on the screen.

During the period of suspension of the frame refresh timer, i.e., before step 330 is executed, the processor of the mobile phone does not process the displaying of animation. Thus, the power consumption on the animation displaying will be reduced.

As disclosed above, the frame refresh timer is resumed when the mobile phone receives the user-interface event without requiring the displaying change on the screen. Resuming the frame refresh timer, specifically, means that the frame refresh timer resumes when a resuming timing period is completed. The resuming timing period (denoted by "$T_A$-a" in FIG. 1) is, for example, the difference between the frame refresh timing period TA and a suspension period (denoted by "a" in FIG. 1). The resuming timing period is the period during which the frame refresh timer is suspended. The suspension period is shorter than the frame refresh timing period $T_A$. In addition, after the resuming timing period ($T_A$-a) is completed, the next frame is displayed and the frame refresh timer is reset to begin another frame refresh timing period $T_A$ and continues timing by the completion of the frame refresh timing period $T_A$. Therefore, when the animation is resumed and played again because of the resumption of the frame refresh timer, the delay period for displaying the following frame immediately after the resumption of the frame refresh timer is reduced to be ($T_A$-a). Therefore, a next frame is displayed at time $t_4$, without a long delay period after the resumption. Furthermore, the power management module can resume the frame refresh timer in other different ways apart from the one disclosed above. For example, the frame refresh timer can be set to have its resuming timing period to be a half of the frame refresh timing period $T_A$ (that is to say, the timing period equals $T_A/2$) for the resumption. After the resuming timing period $T_A/2$ is completed, the following frame immediately after the resumption is displayed and the frame refresh timer then takes the frame refresh timing period $T_A$ as the timing period for the following timing. By doing so, the delay period of the animation displaying after the processing of animation is resumed will thus be reduced.

Furthermore, when the power management module is in the waiting state 240, the power management module can operate in different ways in response to various situations. In addition to the event indicated in step 250, where the frame refresh timing period $T_A$ is completed, and the event indicated in step 280, where the suspension timing period $T_B$ is completed, when the above mentioned mobile phone receives a user-interface event without requiring the displaying change on the screen, which occurs when the input interface is touched by a user, the power management module restarts the suspension timer to begin another suspension timing period $T_B$ for determining when to enter the power saving state, and in the mean time, the mobile phone continues to display the animation. When the mobile phone receives a user-interface event and has to change the screen displaying (for example, the user of the mobile phone inputs a number or clicks on a function via the input interface), the frame is required to change accordingly (for example, to display a number or text). Therefore, the power management module stops the frame refresh timer and the suspension timer, and then the power management module is terminated. After that, other modules can be started to process the event, which requires the displaying change on the screen.

In another embodiment, the steps of the power management method according to the invention can be included in the operating system or other programs of the portable electronic device. When the portable electronic device is at a specific state, such as an idle or standby state, a suspension timer is started. When a timing period of the suspension timer is completed, a specific timer, or timers, related to updating of the content displayed on the screen or another specific timer for triggering an image processing operation is suspended, and the portable electronic device enters a power saving state (such as one shown in step 300), wherein the above mentioned specific timer can also be regarded as a frame refresh timer having a timing period referred to as a frame refresh timing period. The frame refresh timer triggers the image processing operations, and when the frame refresh timer is suspended, the image processing operations will not be performed, thereby reducing the power consumption of the portable electronic device. For example, in the power saving state, the portable electronic device can thus suspend the operations related to the information displaying that moves automatically horizontally within a box area on the screen or suspend the image processing operations, thereby reducing the power consumption of the portable electronic device during the standby state.

Further, when the portable electronic device in a specific state, such as in an idle state or a standby state, displays an image sequence including a plurality of frames, such as pictures, a video, or a presentation, the power consumption of the portable electronic device can be reduced by using the power management method according to the invention.

Figure 4:
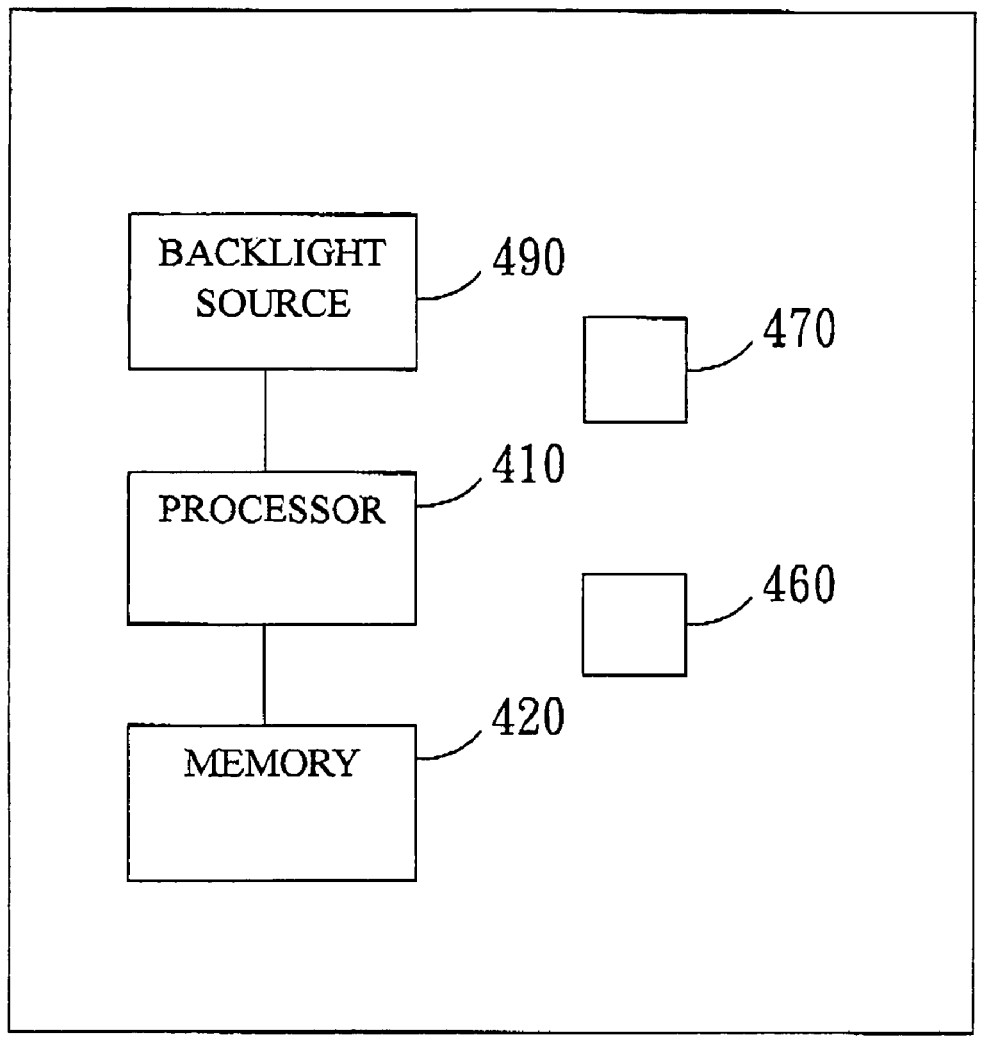
FIG. 4 shows a portable electronic device according to one embodiment according to the invention.

Referring to FIG. 4, the portable electronic device 400 according to an embodiment of the invention includes a processor 410 and a memory 420, and a suspension timer 460. The memory device 420 stores a plurality of instructions and the processor 410, coupled to the memory device, is used for executing the instructions to perform the following acts. A suspension timer is started, wherein the timing period of the suspension timer is a suspension timing period. When the timing period of the suspension timer is completed, a timer (or a number of timers) that is related to the updating of the content displayed on the screen or triggering image processing operations, such as the frame refresh timer 470 in FIG. 4, is suspended so as to be in a power saving state, as shown in step 300. When the timing period of the frame refresh timer is completed, the processor 410 performs an image processing operation so as to display results of the image processing operation, and restarts the frame refresh timer.

In order to reduce power consumption of the portable electronic device, when the frame refresh timer 470 is suspended, the processor 410 does not process the image processing operation. In addition, the power can be saved more effectively if the portable electronic device 400 includes a backlight source 490. That is, when the frame refresh timer 470 is suspended, the processor 410 turns off the backlight source 490. In addition, the power management method disclosed in the examples and embodiments according to the invention above can be implemented in the portable electronic device in FIG. 4. Moreover, in one embodiment, the suspension timer 460 and the frame refresh timer 470 can be implemented by hardware. In another embodiment, one or both of the suspension timer 460 and the frame refresh timer 470 can be implemented by software instructions. It is also noted that the suspension timer 460 and the frame refresh timer 470 can be started at the same time or at different times.

Most of the time, a color portable electronic device, a color mobile phone for instance, is in a standby state. In the power management method according to the invention, the processing of programs being executed by the portable electronic device (the above disclosed animation displaying for instance) is considered for power saving, and the delay period after the processing of the programs is resumed is reduced. The power management method according to the invention saves more power for the mobile phone, e.g. during the standby state, than the conventional power management method in which the processing of the programs being executed by the mobile phone is not considered.

The power management method for a portable electronic device disclosed in the above embodiments of the invention reduces the power consumption of playing animation when the portable electronic device is at a standby state. Furthermore, when the portable electronic device returns to the standby state from a power saving state, the delay period of playing animation will be reduced so as to produce a smooth displaying effect. Therefore, the portable electronic device will have a longer standby time and the user will have positive evaluation of the portable electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management method applied in a portable electronic device, wherein the portable electronic device displays an image sequence comprising a plurality of frames, the method comprising:
   when the portable electronic device enters a standby state:
       starting a frame refresh timer, wherein a timing period of the frame refresh timer is a frame refresh timing period;
       starting a suspension timer, wherein a timing period of the suspension timer is a suspension timing period;
   when the portable electronic device is in the standby state:
       when a frame refresh timing period of the frame refresh timer is completed, displaying one of the frames and setting the frame refresh timer to begin another frame refresh timing period for consecutively displaying the frames;
       when a suspension timing period of the suspension timer is completed, suspending the frame refresh timer and entering a power saving state;
   wherein when the frame refresh timer is suspended, the portable electronic device does not process the image sequence.

2. The method according to claim 1, wherein when the portable electronic device is in the power saving state:
   when the portable electronic device receives a user-interface event without requiring displaying change on the screen, the portable electronic device resumes the frame refresh timer and restarts the suspension timer, and returns to the standby state from the power saving state.

3. The method according to claim 2, wherein when the portable electronic device receives the user-interface event without requiring displaying change on the screen, the frame refresh timer resumes when a resuming timing period is competed, and the resuming timing period is the difference between the frame refresh timing period and a suspension period during which the frame refresh timer is suspended, wherein the suspension time is smaller than the frame refresh timing period.

4. The method according to claim 2, wherein when the portable electronic device receives the user-interface event without requiring displaying change on the screen, the frame refresh timer resumes when a resuming timing period is completed, wherein the resuming timing period is smaller than the frame refresh timing period.

5. The method according to claim 2, wherein when a suspension timing period of the suspension timer is completed, the method further comprises:
   switching off a backlight source of the portable electronic device.

6. The method according to claim 5, wherein when the portable electronic device receives the user-interface event without requiring displaying change on the screen, the method further comprises:
   switching on the backlight source.

7. The method according to claim 1, wherein when the portable electronic device is in the power saving state, the method further comprises:
   stopping the frame refresh timer when the portable electronic device receives a user-interface event requiring displaying change on the screen.

8. The method according to claim 1, wherein when the portable electronic device is in the standby state, the method further comprises:
   restarting the suspension timer when the portable electronic device receives a user-interface event without requiring displaying change on the screen.

9. The method according to claim 1, wherein when the portable electronic device is in the standby state, the method further comprises:

stopping the frame refresh timer and the suspension timer when the portable electronic device receives a user-interface event requiring displaying change on the screen.

10. The method according to claim 1, wherein the frame refresh timing period is shorter than the suspension timing period.

11. A portable electronic apparatus, comprising:

a memory device, storing a plurality of instructions; and a processor, coupled to the memory device, for executing the instructions for performing acts comprising:

starting a frame refresh timer, wherein a timing period of the frame refresh timer is a frame refresh timing period;

starting a suspension timer, wherein a timing period of the suspension timer is a suspension timing period;

when a frame refresh timing period of the frame refresh timer being completed, performing an image processing operation by the portable electronic device so as to display result of the image processing operation, and restarting the frame refresh timer;

when a suspension timing period of the suspension timer is completed, suspending the frame refresh timer;

wherein when the frame refresh timer is suspended, the processor does not process the image processing operation.

12. The apparatus according to claim 11, wherein when a suspension timing period of the suspension timer is completed, the frame refresh timer is suspended, and the processor further, in response to a user-interface event without requiring displaying change on the screen, resumes the frame refresh timer and restarts the suspension timer.

13. The apparatus according to claim 12, wherein the processor, in response to a user-interface event without requiring displaying change on the screen, resumes the frame refresh timer when a resuming timing period is completed, and the resuming timing period is shorter than the frame refresh timing period.

14. The apparatus according to claim 12, further comprising a backlight source, wherein when a suspension timing period of the suspension timer is completed, the frame refresh timer is suspended and the processor further switches off the backlight source.

15. The apparatus according to claim 14, wherein when the processor, in response to the user-interface event without requiring displaying change on the screen, further switches on the backlight source.

16. The apparatus according to claim 11, wherein when a suspension timing period of the suspension timer is completed, the frame refresh timer is suspended, and the processor further stops the frame refresh timer in response to a user-interface event requiring displaying change on the screen.

17. The apparatus according to claim 11, wherein after the suspension timer is started, the processor further restarts the suspension timer in response to a user-interface event without requiring displaying change on the screen.

18. The apparatus according to claim 11, wherein after the suspension timer is started, the processor further stops the frame refresh timer and the suspension timer in response to a user-interface event requiring displaying change on the screen.

19. The apparatus according to claim 11, further comprising a backlight source, wherein when a suspension timing period of the suspension timer is completed, the frame refresh timer is suspended and the processor further switches off the backlight source.

20. The apparatus according to claim 11, wherein the frame refresh timing period is shorter than the suspension timing period.

21. A power management method applied in a portable electronic device, the method comprising:

starting a frame refresh timer, wherein a timing period of the frame refresh timer is a frame refresh timing period;

starting a suspension timer, wherein a timing period of the suspension timer is a suspension timing period;

when a frame refresh timing period of the frame refresh timer being completed, the portable electronic device performing an image processing operation, displaying result of the image processing operation, and restarting the frame refresh timer;

when a suspension timing period of the suspension timer being completed, suspending the frame refresh timer;

wherein when the frame refresh timer is suspended, the portable electronic device does not process the image processing operation.

22. The method according to claim 21, wherein when a suspension timing period of the suspension timer is completed, the frame refresh timer is suspended, and the method further comprises:

resuming the frame refresh timer and restarting the suspension timer, in response to a user-interface event without requiring displaying change on the screen.

23. The method according to claim 22, wherein in response to the user-interface event without requiring displaying change on the screen, the frame refresh timer resumes when a resuming timing period is completed, and the resuming timing period is the difference between the frame refresh timing period and a suspension period during which the frame refresh timer is suspended, and the suspension period is shorter than the frame refresh timing period.

24. The method according to claim 22, wherein in response to the user-interface event without requiring displaying change on the screen, the frame refresh timer resumes when a resuming timing period is completed, and the resuming timing period is shorter than the frame refresh timing period.

25. The method according to claim 21, wherein when a suspension timing period of the suspension timer is completed, the frame refresh timer is suspended, and the method further comprises:

stopping the frame refresh timer, in response to a user-interface event requiring displaying change on the screen.

26. The method according to claim 21, wherein when the suspension timer is started, the method further comprises:

restarting the suspension timer, in response to a user-interface event without requiring displaying change on the screen.

27. The method according to claim 21, wherein when the suspension timer is started, the method further comprises:

stopping the frame refresh timer and the suspension timer in response to a user-interface event requiring displaying change on the screen.

28. An portable electronic apparatus, comprising:
- a suspension timer, wherein a timing period of the suspension timer is a suspension timing period;
- a memory device, storing a plurality of instructions; and
- a processor, coupled to the memory device, for executing the instructions for performing acts comprising:
  - starting a frame refresh timer, wherein a timing period of the frame refresh timer is a frame refresh timing period;
  - starting the suspension timer;
  - when a frame refresh timing period of the frame refresh timer being completed, performing an image processing operation by the portable electronic device so as to display result of the image processing operation, and restarting the frame refresh timer; and
  - when a suspension timing period of the suspension timer being completed, suspending the frame refresh timer;
- wherein when the frame refresh timer is suspended, the processor does not process the image processing operation.

29. A portable electronic apparatus, comprising:
- a frame refresh timer, wherein a timing period of the frame refresh timer is a frame refresh timing period;
- a memory device, storing a plurality of instructions; and
- a processor, coupled to the memory device, for executing the instructions for performing acts comprising:
  - starting the frame refresh timer;
  - starting a suspension timer, wherein a timing period of the suspension timer is a suspension timing period;
  - when a frame refresh timing period of the frame refresh timer being completed, performing an image processing operation by the portable electronic device so as to display result of the image processing operation, and restarting the frame refresh timer; and
  - when a suspension timing period of the suspension timer being completed, suspending the frame refresh timer;
- wherein when the frame refresh timer is suspended, the processor does not process the image processing operation.

* * * * *